United States Patent

[11] 3,609,398

[72] Inventor John William Kronlage
Richardson, Tex.
[21] Appl. No. 788,205
[22] Filed Dec. 31, 1968
[45] Patented Sept. 28, 1971
[73] Assignee Texas Instruments Incorporated
Dallas, Tex.

[54] HIGH-SPEED INTEGRATED LOGIC CIRCUIT

7 Claims, 3 Drawing Figs.

[52] U.S. Cl. .......... 307/237, 307/214, 307/300
[51] Int. Cl. .......... H03k 5/08
[50] Field of Search .......... 307/218, 300, 214, 237, 253; 330/110, 85

[56] References Cited

UNITED STATES PATENTS

| | | | |
|---|---|---|---|
| 2,999,169 | 10/1961 | Felner | 307/237 |
| 3,160,765 | 12/1964 | Krossa | 307/300 |
| 3,215,851 | 11/1965 | Warnock | 307/237 |
| 3,275,854 | 10/1966 | Ciancioca | 307/300 |
| 3,388,266 | 6/1968 | Kjar | 307/237 |

*Primary Examiner*—Donald D. Forrer
*Assistant Examiner*—David M. Carter
*Attorneys*—James O. Dixon, Andrew M. Hassell, Harold Levine, Melvin Sharp, John E. Vandigriff, Henry T. Olsen and Michael A. Sileo, Jr.

ABSTRACT: High-speed logic switching is accomplished by employing an antisaturation clamped, prebiased output stage in a logic circuit of transistors having a high internal cutoff frequency. An output transistor in a logic circuit is shunted between the base and collector electrodes with a clamping transistor which shunts excess base drive to the collector electrode, thus preventing saturation thereof. When in a nonamplification mode, the clamping transistor comprises part of a voltage divider network that prebiases the base electrode of the output amplifier. This divider network is connected to a reference voltage in a circuit including series-arranged diodes.

Figure 1:
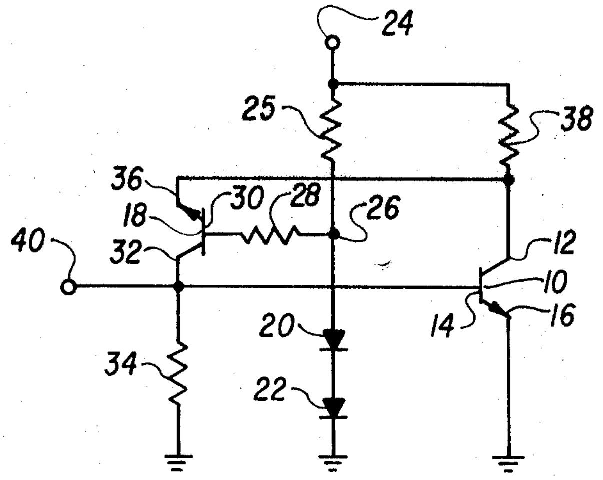

INVENTOR
JOHN W. KRONLAGE

BY Henry T. Olsen
ATTORNEY

HIGH-SPEED INTEGRATED LOGIC CIRCUIT

This invention relates to high-speed switching devices, and more particularly to an amplifier operating in a prebiased, antisaturation mode for high-speed turn on and turnoff.

Switching circuitry is employed to produce a discrete change of state in a signal that may take the form of a voltage change, a current change, or both. Logic switching may be used to perform logical operations as in a computer, or to transfer energy as in relay drivers and switching regulators. In logical operations, as in a computer, an important consideration is the switching speed of the device, i.e., the time required for the discrete change of state to occur.

When transistors are used as the active elements in switching circuitry, the primary limiting factor with respect to the switching speed is the time required to turn on and turn off the collector current. A transistor cannot change states in zero time; the time interval between initiation and completion of the switching action is a measure of switching speed. The period of time to change a transistor from the off state to the on state, referred to as "rise time," can be minimized by driving the base electrode with fairly large electrical signals. Unfortunately, this tends to drive the transistor into a saturated condition, to the detriment of another factor affecting the switching speed, this being the "storage time."

In saturated switching circuits, the on state is marked by a very low collector voltage and relatively large collector current. The off state is marked by a relatively high collector voltage and a very small collector current. When the transistor is saturated, the collector-base junction is forward biased and the base region stores a large concentration of minority carriers. Before the transistor can be considered turned off, the collector-base junction has to be returned to the usual reverse bias state. The time period required to return the collector-base junction to the reverse bias state, referred to as the storage time, is often the primary limiting factor affecting switching speed. Thus, the operating speed of a logic circuit is often a compromise between using sufficient drive voltage to obtain a fairly short rise time, but yet keeping the transistors out of saturation to avoid unduly long storage time.

Several techniques have been developed for increasing the switching speed of logic circuits. One such technique includes externally shunting the collector-base junction to prevent saturation of the transistor. This prevents the collector-base junction from becoming forward biased, a condition necessary for saturation, and, therefore, avoids storage of a high concentration of minority carriers in the base. There are also several clamping circuits available that prevent a transistor from going into saturation.

An object of the present invention is to provide high-speed switching circuitry. Another object of the present invention is to provide a logic switching circuit having a minimum of storage time. Still another object of this invention is to provide a logic switching circuit fabricated in an integrated circuit configuration using present manufacturing processes.

In addition to improving the switching speed of a logic circuit by minimizing the storage time, additional improvement in switching speed may be obtained by biasing the transistors which are in an off state at a level just below the threshold of the base-to-emitter circuit to provide a faster turn on time. In addition to sweeping out the base region of minority storage carriers when a transistor is operating in a saturated condition, the necessity of charging the inherent base-to-emitter capacitance of the transistor increases the switching time for changing from the off state to the on state. By biasing the base-to-emitter junction at a level below circuit threshold, the charge time for this inherent capacitance can be significantly reduced. Accordingly, it is another object of this invention to provide prebiased transistor logic circuitry.

In accordance with this invention, the output transistor of a logic switching circuit is shunted between the base electrode and collector electrode by a clamping transistor having the collector-base junction operating in a saturated mode in both the on state and off state. A base drive signal to the output transistor also turns on the clamping transistor and the emitter-base junction thereof saturates, thereby keeping the output transistor from saturating by preventing the collector-base junction from becoming forward biased. A reference voltage is supplied to the base electrode of the clamping transistor through a biasing resistor, which, along with the base-collector junction of the clamping transistor, and a second biasing resistor, forms a voltage divider network to prebias the base-emitter junction of the output transistor. In one embodiment, the reference voltage is supplied by a series of interconnected diodes.

A more complete understanding of the invention and its advantages will be gained from the specification and claims and from the accompanying drawings illustrative of the invention.

Figure 2:
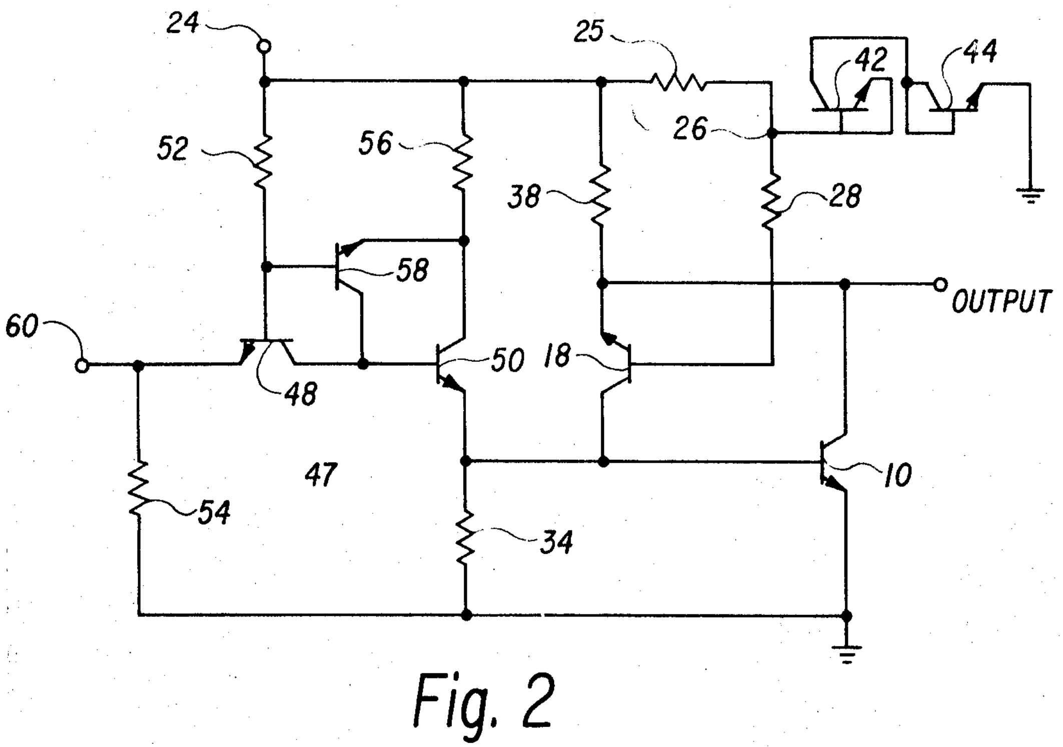
Figure 3:
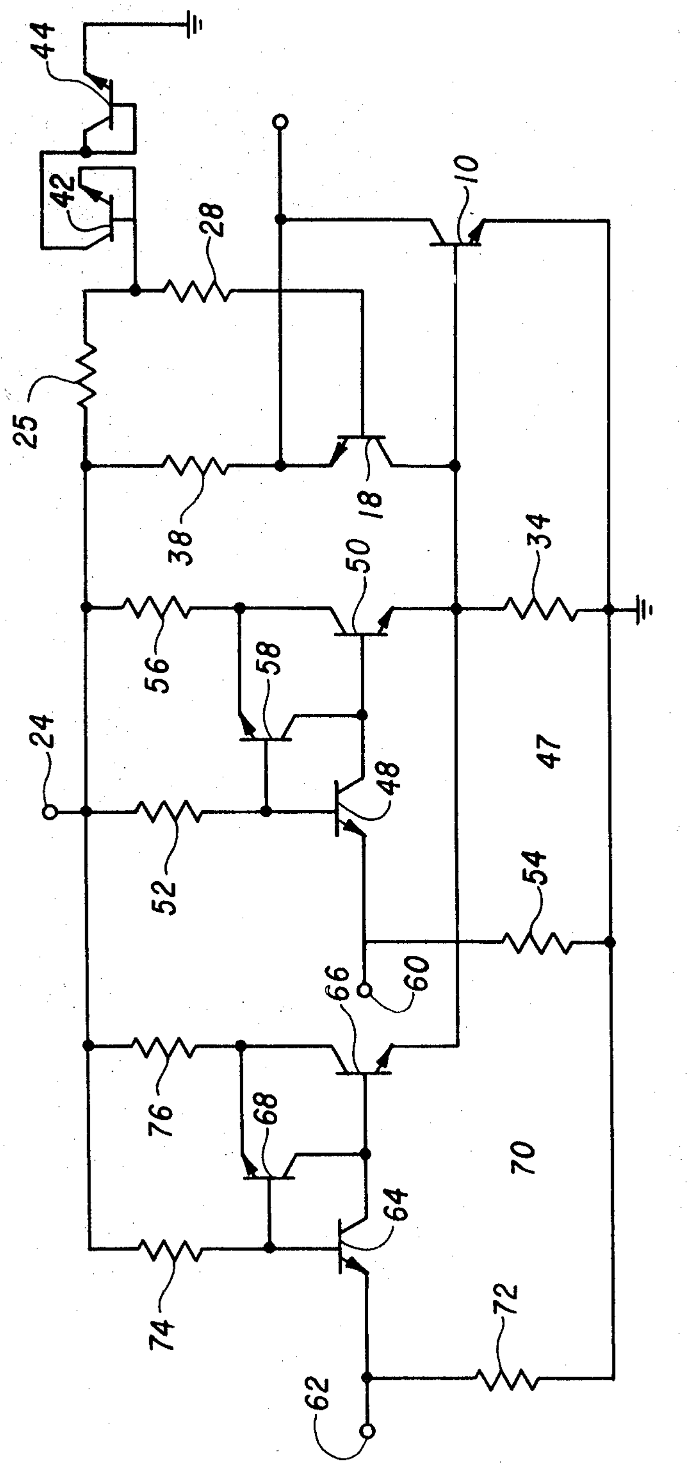

Referring to the drawings:

FIG. 1 is a schematic of an inverter amplifier including a transistor clamp between the base electrode and collector electrode, and prebiasing of the base-emitter junction;

FIG. 2 is a schematic of a logic switching circuit including a temperature-compensated reference voltage source for a clamping transistor across the output transistor; and FIG. 3 is a schematic of a logic OR-invert circuit employing a clamping transistor shunting the base-collector diode of the output transistor and the drive transistors. Referring to FIG. 1, there is shown a high-speed switching amplifier including an output transistor having a collector electrode 12, a base electrode 14 and an emitter electrode 16. When a voltage at the base electrode 14 exceeds the threshold level, the base-emitter junction becomes forward biased, thereby turning on the transistor. A voltage in excess of the threshold level will also result in the collector-base junction being forward biased; the transistor would then be operating in a saturated mode. In a saturated mode, the base region stores a large concentration of minority carriers which must be swept out before the transistor can be again turned off. Saturation of the transistor 10 can be prevented by maintaining the collector-to-emitter potential at a level to prevent forward biasing of the collector base junction; that is, at a level above the collector-emitter saturation voltage, $V_{CE\text{-}Sat.}$CE-Sat.

In accordance with this invention, a clamping transistor 18 conducts when the base drive to the transistor 10 exceeds a predetermined value, thus shunting the base current to the collector electrode 12 and preventing the collector-base junction from becoming forward biased. The transistor 18, itself, immediately goes into saturation, thereby establishing a fixed, predetermined differential across the base-collector junction of the transistor 10. The circuit for controlling the operation of the transistor 18 includes a reference voltage source comprising diodes 20 and 22 connected in series with a resistor 25 and to a direct-current supply (not shown) at the terminal 24. A voltage at the terminal 24 forward biases the diodes 20 and 22 to establish a voltage at the terminal 26 equal to the sum of the forward drops across these diodes. A biasing resistor 28 couples the terminal 26 to the base electrode 30 of the transistor 18. The collector electrode 32 of the transistor 18 connects to the base electrode 14 of the transistor 10 and to a biasing resistor 34. The emitter electrode 36 of the transistor 18 is interconnected to the collector electrode 12 of the transistor 10 and a load resistor 38, also connected to the terminal 24.

In operation, with an input voltage at the terminal 40 below the forward biasing level of the emitter-base junction of the transistor 10, the resistors 28 and 34, along with the collector-base junction of the transistor 18, forms a voltage-divider network. By proper selection of the values for the resistors 28 and 34, the forward voltage of one of the diodes 20 or 22 will be dropped one-half across the resistor 28 and one-half across the resistor 34. The other diode drop is balanced by the collector-base junction of the transistor 18. This establishes a voltage drop across the resistor 34 equal to approximately one-half the base-to-emitter threshold voltage, ½ $V_{BE}$, for the transistor 10. Any inherent capacitance between the base electrode 14 and the emitter electrode 16 will be partially charged, thereby prebiasing the transistor 10. Transistor 10, however, will be in an off state and remain so as long as the input voltage at the terminal 40 does not forward bias the emitter-base junction of the transistor 10. In addition, the clamping amplifier 18 will be in an off state with current flowing only in the collector-base junction thereof.

When the input voltage level at the terminal 40 exceeds the circuit threshold, which is $V_{BE}$, the transistor 10 becomes forward biased and starts to switch from an off state to an on state. The switching time, i.e., the rise time, will partially be minimized by the prebiasing effect of the voltage drop across the resistor 34. Further, the switching time from the on state to the off state will also be minimized by the clamping action of the transistor 18. As the output transistor 10 turns on, the clamping transistor 18 switches from an off state to an on state. The emitter-base junction of the transistor 18 immediately becomes forward biased and the transistor 18 goes into saturation. In a saturated condition, the voltage drop from the collector electrode 32 to the emitter electrode 36 will be equal to the collector-to-emitter saturation voltage, $V_{CE\text{-}Sat.}$ This automatically holds the collector-base junction of the transistor 10 only slightly forward biased, a condition which will prevent saturation of the transistor 10. The output voltage at the collector electrode 12 is equal to approximately the base-to-emitter drop of the output transistor minus the collector-to-emitter saturation voltage of the transistor 18, i.e., $V_{BE}-V_{CE\text{-}Sat}$.

Thus, the circuit of FIG. 1 provides both high-speed switching from the off to the on state, and from the on to the off state. The prebiasing action of the resistor 34 produces high-speed switching from the off state to the on state, and the clamping action of the transistor 18 prevents storage of minority carriers in the base 14 of the transistor 10, thereby minimizing the storage time and increasing the switching speed from on to off.

Referring to FIG. 2, there is shown the high-speed switching amplifier of FIG. 1 in a logic-inverting circuit. Where applicable, like numbers will be used in the various Figures for like components. The clamping transistor 18 is connected in a manner to shunt the collector-base junction of the output transistor 10. A reference voltage is applied to the base electrode of the transistor 18 through the biasing resistor 28 which connects to a series circuit of transistors 42 and 44. The reference voltage at the terminal 26 will be determined by the forward voltage drop across the collector-base junction of the transistor 42 and the emitter-base junction of the transistor 44. Connected between the junction 26 and the terminal 24 is a current-limiting resistor 25. The load resistor 38 again establishes the current flow through the transistor 10, when it is conducting. The transistor 10 is prebiased by the voltage drop across the resistor 34.

Base drive voltages for the transistor 10 are generated by a driving circuit including an input transistor 48 coupled collector-to-base with a driving transistor 50. The base-emitter circuit for the transistor 48 includes a base drive resistor 52 connected to the terminal 24 and an input resistor 54 coupled to ground potential. A load resistor 56 establishes the current flow through the transistor 50, when conducting. To prevent saturation of the transistor 50, a clamping transistor 58 is shunted across the collector-base junction. Transistor 58 includes an emitter terminal connection to the collector of the drive transistor 50, and a collector terminal connection to the base electrode of the drive transistor. A base drive voltage for the transistor 58 is the same as that generated for the transistor 48.

In operation, with the input to terminal 60 low, current flows through resistor 52 and the emitter-base junction of the transistor 48. The current gain of the transistor 48 develops a reverse turnoff current at the base terminal of the transistor 50, thereby holding this transistor in the off state.

Transistor 10 is prebiased by the voltage drop across the resistor 34, as was described previously. The transistors 42 and 44, however, provide a reference voltage at the terminal 26 that is temperature compensated. At all temperatures, the forward drop of the collector-base junction of the transistor 42 is balanced by the collector-base junction of the output transistor 18, and one-half the forward drop of the emitter-base junction of the transistor 10 as a result of the voltage divider action of resistors 28 and 34. This prebiases the base electrode of the transistor 10, thereby reducing the signal swing required to turn on this transistor and, hence, increase the switching speed.

When the input voltage to the terminal 60 exceeds the circuit threshold level ($2V_{BE}$), current flows through the collector-base diode of the transistor 48, thereby turning on the transistor 50. Transistor 58 is then also turned on and immediately saturates, thus maintaining the collector-base forward drop of the transistor 50 to a level no greater than the saturation voltage, $V_{Sat.}$, of the transistor 58. Conduction through the transistor 50 supplies a turn on current to the transistor 10; however, as explained previously, this transistor is kept out of saturation by the clamping action of the transistor 18.

It should be noted that the present invention is completely compatible with AND-OR-INVERT configurations by paralleling other transistors across transistor 50 which are driven from other input circuits identical to the configuration of transistors 48 and 58 and resistor 52, 54 and 56.

Referring to FIG. 3, there is shown a logic circuit incorporating the present invention where either a signal on terminal 60 or a signal on terminal 62 will turn on the output transistor 10. The drive circuit for transistors 48, 50 and 58, along with the resistors 52, 54 and 56, is duplicated in FIG. 3. Transistors, 64, 66 and 68 operate in the same manner as their counterparts in the drive circuit 47. In the drive circuit 70, resistors 72, 74 and 76 establish the same circuit operation as their counterparts in the drive circuit 47. Specifically, transistor 64 controls the conducting state of the transistors 66 and 68. Transistor 66 provides the drive current to turn on the output transistor 10 when the input voltage at the terminal 62 exceeds the threshold voltage of the circuit 70. Transistor 68 shunts excess base-drive current to the transistor 66 when in an on state, thus preventing saturation of the transistor 66.

The transistor 10 is also maintained in a nonsaturated condition by the clamping action of the transistor 18. The output transistor 10 is prebiased by the circuit consisting of resistors 28, 34 and 25 along with transistors 42 and 44. The load resistor 38 establishes the current flow through the transistor 10, when conducting.

Thus, the prebiased, clamped output amplifier of FIG. 1 can be incorporated into circuitry for performing all required logic functions and can easily be modified into complex gate arrangements, such as J-K flip-flops, counters, registers or other devices.

While the invention has been described with reference to a preferred embodiment, and shown in the accompanying drawings, it will be evident that various further modifications are possible without departing from the scope of the invention.

What is claimed is:

1. An antisaturation, prebiased, a high-speed transistor logic circuit comprising:
   (a first) an output transistor having an emitter electrode at ground potential, a collector electrode connected to an output terminal and to a supply voltage through an output resistor, and (including) a base electrode connected to ground potential through a prebiasing resistor,
   a drive source coupled to the base electrode of said output transistor for supplying driving current to control conduction through said (first) output transistor,
   a (second) clamping transistor having its emitter and collector electrodes (including a base collector diode with the collector electrode) respectively connected to the collector and base of electrodes of said output transistor,
   a series-connected pair of PN junction devices coupled between said supply voltage and ground potential to provide a fixed-voltage terminal; wherein said clamping transistor has its base terminal coupled to said fixed voltage terminal through a biasing resistor for coupling a prebiasing voltage to the base terminal of said output transistor when said output transistor is in its OFF state, said prebiasing voltage being developed through a series circuit, including said fixed voltage terminal, said biasing resistor, the base-collector junction of said clamping transistor, and said prebiasing resistor; and wherein said output transistor is maintained below saturation when in its ON state by a series circuit including the base terminal of said output transistor, the collector terminal of said clamping transistor, the collector-emitter junction of said clamping transistor, the emitter terminal of said clamping transistor, and the collector terminal of said output transistor.

2. An antisaturation, prebiased, high-speed transistor logic circuit as set forth in claim 1 wherein said drive source includes:

a first drive transistor having a collector electrode, coupled to said supply voltage, a base electrode, and an emitter electrode connected to the base electrode of said (first) output transistor and to said (second) prebiasing resistor, a second clamping transistor having a base electrode, an emitter electrode coupled (tied) to the collector electrode of said first drive transistor and a collector electrode coupled to the base electrode of said first drive transistor for clamping the collector electrode thereof at a fixed level above the emitter electrode thereof when said first drive transistor operates in an amplification mode, and an input transistor having a base electrode coupled to the base electrode of said second clamping transistor, a collector electrode coupled (tied) to the base electrode of said first drive transistor, and an emitter electrode connected to (a signal source) an input terminal.

3. An antisaturation, prebiased, a high-speed, transistor logic circuit as set forth in claim 2, wherein said (voltage source comprises) PN junction devices are first and second diodes coupled in series (to the first) with said biasing resistor and (a direct current) said supply voltage for providing said prebiasing voltage to said output transistor.

4. An antisaturation, prebiased, a high-speed, transistor logic circuit as set forth in claim 2 wherein said (voltage source includes) PN junction devices are first and second transistors, with the emitter-base (diode) circuit of (the) said first transistor and the collector base (diode) circuit of (the) said second transistor (are) interconnected in series (to the first) with said biasing resistor (to provide a) and said ground potential for providing temperature-compensated prebias to (the first) said output transistor.

5. An antisaturation, prebiased, transistor logic switch, comprising in combination:

a. an output transistor having a collector terminal coupled to a supply voltage, through an output resistor, an emitter terminal coupled to a reference voltage, and a base terminal coupled to a signal source and to said reference voltage through a prebiasing resistor;

b. a clamping transistor having its emitter and collector terminals respectively coupled to the collector and base terminals of said output transistor;

c. a series-connected resistor-diode circuit coupled between said supply voltage and said reference voltage to provide a fixed voltage terminal; wherein d. said clamping transistor has its base terminal coupled to said fixed voltage terminal through a biasing resistor for coupling a prebiasing voltage to the base terminal of said output transistor when said output transistor is in its OFF state. Said prebiasing voltage being developed through a series circuit including said fixed voltage terminal, said biasing resistor, the base-collector junction of said clamping transistor, and said prebiasing resistor; and wherein e. said output transistor is maintained below saturation when in its ON state by a series circuit including the base terminal of said output transistor, the collector terminal of said clamping transistor, the collector-emitter junction of said clamping transistor, the emitter terminal of said clamping transistor, and the collector terminal of said output transistor.

6. An antisaturation prebiased, transistor logic switch as set forth in claim 5 wherein said series-connected circuit includes a pair of series diodes connected between said fixed voltage terminal and said reference voltage.

7. An antisaturation, prebiased transistor logic switch as set forth in claim 5 wherein said series-connected circuit includes first and second transistors, with the emitter-base junction of said first transistor and the collector-base junction of said second transistor interconnected in series between said fixed voltage terminal and said reference voltage.